Aug. 3, 1965 C. P. HALSTED 3,198,963

ELECTRONIC CIRCUIT FOR GENERATING LINEAR TIME-BASE WAVEFORMS

Filed Jan. 14, 1963

INVENTOR.
CHARLES P. HALSTED
BY Francis A. Varallo
AGENT

United States Patent Office 3,198,963
Patented Aug. 3, 1965

3,198,963

ELECTRONIC CIRCUIT FOR GENERATING LINEAR TIME-BASE WAVEFORMS

Charles P. Halsted, Oreland, Pa., assignor to Burroughs Corporation, Detroit, Mich., a corporation of Michigan Filed Jan. 14, 1963, Ser. No. 251,324
18 Claims. (Cl. 307—88.5)

This invention relates generally to wave-shape generating circuits, and more particularly to electronic circuits for providing extremely linear time bases or saw-tooth signal waves.

Linear time-base circuits are employed in a variety of electronic equipment. Such circuits provide an output waveform which exhibits a linear variation of voltage or current with time throughout the entire waveform, or at least over a portion thereof. For many applications an appropriate signal waveform is the saw-tooth. This waveform has an amplitude which varies substantially linearly with time between two values. Time-base generators which produce a saw-tooth wave are also commonly referred to as saw-tooth generators or ramp generators.

Perhaps the most well-known application of the linear time-base circuit is in connection with a cathode-ray oscilloscope. In this instance, saw-tooth currents and voltages are employed respectively with electromagnetic or electrostatic deflection systems to deflect an electron beam across the oscilloscope display screen. It is interesting to note that waveforms of the saw-tooth shape are commonly designated as sweep waveforms even in applications not involving the deflection of an electron beam. Other equally important applications of time-base circuits may be found in electronic computers, radar and television equipment, in precise time measurement devices, and in data-transmission schemes employing time modulation.

A variety of prior art circuits are available for time-base applications. Although many of such circuits are identified as linear time-base generators, they do not provide sweep waveforms which are precisely linear. Likewise considerable variations exist among prior art circuits with respect to deviations from linearity of their output waveforms. It should be appreciated that an important factor governing the selection of a time-base is the degree of linearity demanded by the particular application in which it will be used. For example, it is likely that a time-base circuit which is suitable for use in an oscilloscope, would be completely inadequate in a radar device where accuracy of target range is a function of the linearity of the time-base.

Many prior art time-base generators provide a degree of linearity which is a function of the signal gain provided by amplifier means associated with the circuit. As the signal gain is increased, as for example by the cascading of amplifier stages, the linearity of such known circuits is increased. Theoretically perfect linearity can be achieved in these circuits only with infinite gain. The circuit of the present invention utilizes a mode of operation which achieves a high degree of linearity, but not as a direct function of high gain. Instead the amplifier means in the present invention is required to provide only moderate gain, and the linearity of the output waveform is a function of the respective degenerative and regenerative effects of a pair of feedback paths on the output waveform.

Accordingly, it is a general object of the present invention to provide an improved linear time-base generator.

Another object of this invention is to provide a saw-tooth wave generator which is reliable and requires relatively few circuit components for a high degree of linearity.

A further object of the invention is to provide a sweep-waveform generator in which the linearity of the output waveform is affected by, but is not entirely dependent upon the signal gain of its associated amplifier.

A still further object of this invention is to provide a saw-tooth wave generator in which the high degree of linearity present therein results from the co-operative relationship of a pair of feedback paths.

A complete understanding of this invention and the objects and features thereof may be gained from the following description and annexed drawings, in which.

Before proceeding with a detailed description of the invention it should be noted that conventional graphical symbols have been employed to designate the emitter, collector and base electrodes of each of the transistors. However, the invention is restricted neither to the types of transistors depicted, nor to the use of the transistors themselves, but may employ other types of transistors or current amplifying devices in accordance with established design procedures well-known to those skilled in the art.

Figure 2:
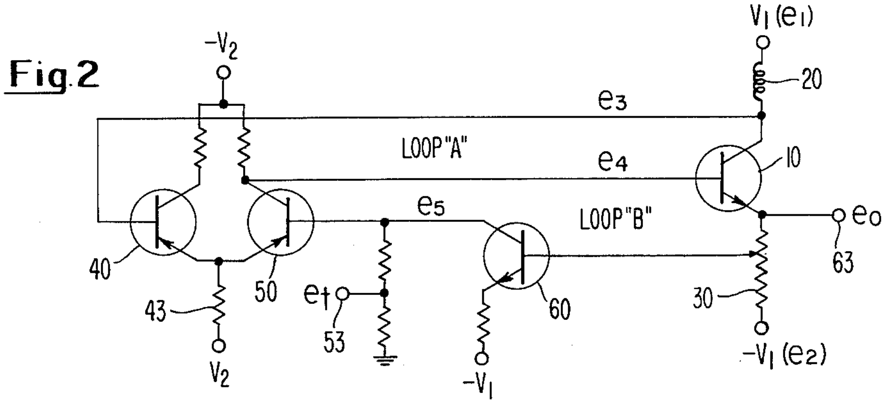
FIG. 2 is a schematic diagram of a representative embodiment of the saw-tooth wave generator of the present invention, constructed in accordance with the block diagram of FIG. 1.

The positive and negative supply voltages for the transistors listed respectively in order of increasing absolute magnitude are for FIG. 2: $V_1$, $V_2$ and $-V_1$, $-V_2$ and for FIG. 4: $V_{1'}$, $V_{2'}$, $V_{3'}$ and $-V_{1'}$, $-V_{2'}$, $-V_{3'}$, $-V_{4'}$. Considering a particular group of positive polarity supply voltages, such as $V_{1'}$, $V_{2'}$, $V_{3'}$, the higher the subscript number such as 3′, the greater the amplitude of the associated voltage relative to the other voltages with lower subscript numbers, 1′ and 2′, in the same group. However, it is to be noted that the use of the same subscript numbers appearing respectively in different groups, such as $V_2$ and $-V_2$, does not necessarily mean that the absolute magnitudes of these positive and negative supply voltages are the same.

Figure 3:
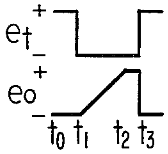
FIG. 3 is a diagram depicting idealized voltage waveforms associated with the operation of the circuit of FIG. 2.
Figure 5:
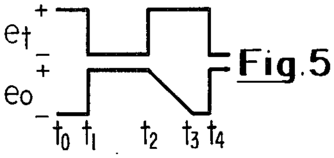
FIG. 5 is a diagram depicting idealized voltage waveforms associated with the circuit of FIG. 4.

With regard to the plus and minus signs assigned to the voltage waveforms of FIGS. 3 and 5, these signs represent the relative polarities of various portions of the waveforms and not necessarily absolute polarities with respect to ground reference.

Figure 1:
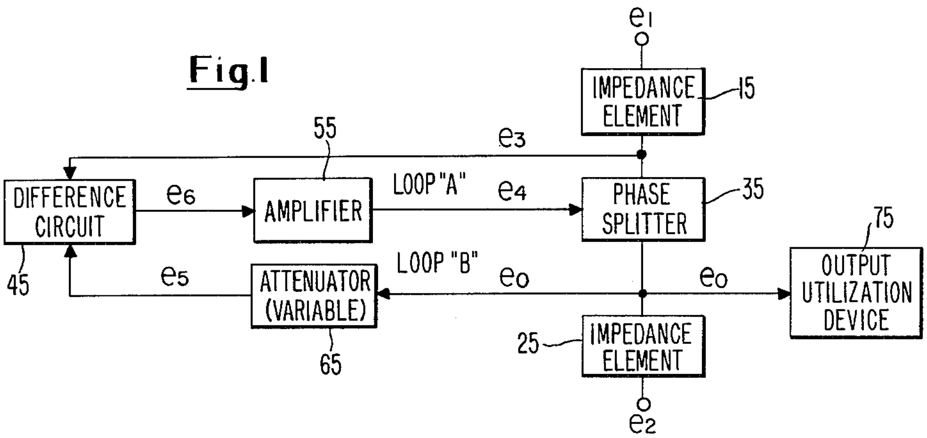
FIG. 1 is a block diagram illustrating the operational featurees of the present invention.

Referring now to the block diagram of FIG. 1, there are shown two circuit loops designated respectively, Loop "A" and Loop "B." The voltages appearing respectively at various terminals or junctions of the loops are designated $e_0$ to $e_6$ inclusive. Similar designations have been employed throughout the remaining FIGURES for ease of comparison. A pair of impedance elements 15 and 25 are connected in series relationship with a phase-splitting element 35 and voltage $e_1$ and $e_2$ supplied from sources of electrical power which have not been shown. The voltage $e_3$ which is the resultant of voltage $e_1$ and the voltage drop across impedance element 15, is applied to one of a pair of terminals associated with a difference circuit 45. Voltage $e_0$, the output signal, is attenuated by a predetermined factor in the attenuator 65. The attenuator 65 provides an output signal $e_5$ which is fed to the other of said pair of input terminals of the difference circuit 45. The difference in the amplitudes of voltages $e_5$ and $e_3$ is the output voltage of the difference circuit, namely, $e_6$. This last voltage is amplified in amplifier 55. The output of amplifier 55, which is $e_4$, is applied to the input of phase-splitter 35. Since it is the general function of the phase splitter 35 to produce two comparative output signals differing in polarity in response to one input signal, voltages $e_3$ and $e_0$ are responsive to the magnitude of input voltage $e_4$.

Thus far only the mechanical arrangement of the elements comprising the instant time-basis circuit has been considered. Referring further to FIG. 1, for the purpose of describing the general mode of operation of the present invention, it will be assumed that in a first case impedance element 25 is a resistor R, and impedance element 15 is an inductor L. As is well known, if the inductance L is a pure inductance and the voltage across L is constant, then a constant time rate of change of the current flowing therethrough will result. If it is further assumed that the phase-splitter 35 is capable of maintaining the flow of equal magnitudes of current on either side thereof, then the voltage appearing across resistance R, which is the output voltage, appears in the form of a ramp of voltage. Also if voltage $e_1$ is assumed to be constant, then the current rise through inductance L is proportional with respect to time depending upon voltage $e_3$. It will be apparent then, if $e_3$ is held constant, instead of its usual nature as described hereinafter, the degree of constancy of voltage $e_3$ is dependent upon the gain of amplifier 55. Theoretically as the gain of amplifier 55 approaches infinity tendencies for the voltage $e_3$ to vary from a preselected value become non-existant.

The foregoing consideration assumed that the inductance L was a pure inductance. In actual practice, however, the inductance L may be more correctly described as consisting of a pure inductance and a series resistance. In order to obtain a constant rate of change of current flow through the practical inductance, it is necessary that a ramp of voltage, rather than a constant voltage, be applied across the terminals of the inductance. Since $e_1$ has been described as a constant voltage, $e_3$ must be allowed to vary a controlled amount directly with time, thereby resulting in a constant rate of change of current across the inductance L. Under these conditions a corresponding linear output ramp of voltage, $e_0$, appears across the resistance R. The voltage $e_3$ is allowed to vary just the right amount by adjusting the attenuator in Loop "B," which in turn determines the percentage of the output voltage fed back to the difference circuit 45. Stated another way, $e_0$, the output voltage, varies in accordance with $e_4$, the voltage applied to the input of phase-splitter 35. The voltage $e_4$ in turn is equal to the product of $e_6$ and the gain of amplifier 55. As previously mentioned, $e_6$ is the output voltage of difference circuit 45, and is the resultant of voltages $e_5$ and $e_3$.

In a second case of mechanizing the block diagram of FIG. 1, the impedance element 15 may be a resistor R, and impedance element 25 may be a capacitor C.

If only fedback Loop "A" were present, the linearity of the output ramp of voltage would be directly related to the gain of amplifier 55. On the other hand, the present invention contemplates the use of a second feedback Loop "B," which introduces a ramp of voltage of proper amplitude into Loop "A" thereby ensuring that a constant current will flow into the capacitance C for the duration of the ramp.

Figure 4:
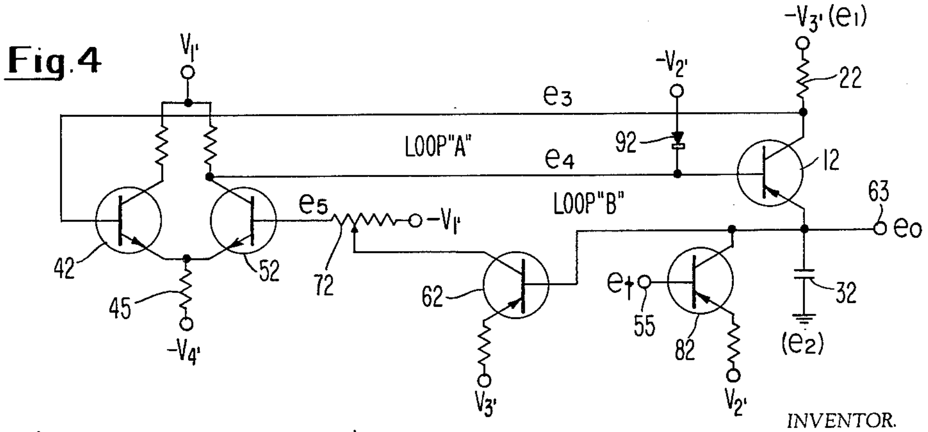
FIG. 4 is a schematic diagram of a further representative embodiment of the saw-tooth wave generator of the present invention, constructed in accordance with the block diagram of FIG. 1.

A more complete understanding of the operation of the invention will be had from a consideration of FIGS. 2 and 4 which are schematic drawings of circuit embodiments illustrating the concepts outlined in FIG. 1.

Referring now to the representative circuit of FIG. 2, a comparison of its elements will be made with those of the block diagram of FIG. 1. In FIG. 2 there are shown two PNP transistors 40 and 50, and a pair of NPN transistors 10 and 60. An inductance 20 and a potentiometer 30 correspond respectively to the impedance elements 15 and 25 of FIG. 1. Transistor 10 performs the phase-splitting function of the phase-splitter 35, also shown in FIG. 1. Transistors 40 and 50 comprise a differential amplifier circuit, and provide the combined functions of the difference circuit 45 and the amplifier 55 of FIG. 1. The function of attenuator 65 is accomplished by potentiometer 30 in combination with transistor 60.

One end of inductance 20 is connected to a voltage source $V_1$, which is the counterpart of $e_1$ in FIG. 1. The other end of inductance 20 is connected in common to the collector electrode of transistor 10 and the base electrode of transistor 40. The collector of transistor 50 is conected to the base of transistor 10. The emitter electrode of transistor 10 is connected to one end of potentiometer 30; the other end of potentiometer 30 is connected to a source of negative potential, $-V_1$, the $e_2$ of FIG. 1. The movable contact arm of potentiometer 30 is connected to the base of transistor 60. The emitter of transistor 60 is connected to source $-V_1$, and the collector of transistor 60 is connected to the base of transistor 50. The collector of transistor 50 is coupled to a source of bias potential $-V_2$, and also to the base of transistor 10, as previously mentioned. Likewise, the collector electrode of transistor 40 is connected to the same source of potential, $-V_2$. The emitter electrodes of transistors 40 and 50 are connected in common by a resistive element to 43 to a source of positive bias potential, $V_2$.

The voltage $e_3$ appears on the collector of transistor 10, and the base of transistor 40; $e_4$ is the potential appearing on the base of transistor 10, and the collector of transistor 50; $e_5$ is the voltage on the collector of transistor 60, and the base of transistor 50; $e_0$ is the output sweep voltage appearing on the emitter of transistor 10, and across potentiometer 30; and $e_t$ is the trigger voltage applied to terminal 53 and appearing on the base of transistor 50, to initiate and sustain the active or sweep generating cycle of operation for the circuit.

Feedback Loop "A" comprises the electrical path linking the collector of transistor 10, the base of transistor 40, the common emitters of transistors 40 and 50, the collector of transistor 40 and the base-collector path of transistor 10.

Feedback Loop "B" comprises the electrical circuit connecting the emitter of transistor 10, a selected portion of the resistive element of potentiometer 30, the base-collector path of transistor 60, the base-collector path of transistor 50, and the base-emitter circuit of transistor 10.

The operation of the circuit of FIG. 2 will be considered in detail in connection with the waveform diagrams of FIG. 3. Initially it should be noted that the time base circuit of FIG. 2 is adapted to perform only one cycle of operation on each occasion upon which a trigger pulse or control signal is applied to an appropriate element of the circuit, such as terminal 53. Thus the circuit of FIG. 2 may be said to be triggered or externally operated. During the time that a trigger pulse $e_t$ is present on terminal 53, the circuit produces a single-stroke time base. When the circuit receives no trigger pulse it remains in a quiescent state. Conversely, the circuit is in an active state during the generation of the sweep voltage.

At time $t_0$ the circuit is in a quiescent state. As hereinbefore mentioned, the transistors 40 and 50 comprise a differential amplifier. The common emitter circuit of transistors 40 and 50, in connection with emitter resistance 43 and potential source $V_2$ provide a substantially constant current generator. This constant current will flow through either transistor 40 or transistor 50 depending upon which of the transistors has a more negative potential applied to its base electrode. During the quiescent state, the potential on trigger terminal 53 which also appears on the base electrode of transistor 50 is selected to be positive with respect to the potential $e_3$ appearing on the base of transistor 40. Consequently transistor 40 is in a conductive state and transistor 50 is non-conductive. The collector of transistor 50 is substantially at the potential of the $-V_2$ supply. This last potential, which is $e_4$, appears also on the base of transistor 10. Since the emitter of NPN transistor 10 is substantially at the $-V_1$ potential, and is therefore positive with respect to the potential on the base of transistor 10, this transistor is biased to non-conduction. In summary then, whenever transistor 50 is OFF, transistor 10 is likewise OFF.

At a later time $t_1$, trigger pulse $e_t$ is applied to terminal 53 to initiate the sweep cycle. The degenerative action of feedback Loop "A," considered in the absence of feedback Loop "B," will now become apparent. The negative-going trigger pulse $e_t$ appearing on the base of transistor 50, causes the latter base to become initially more negative than the base of transistor 40, with the result that transistor 50 is biased to conduction. The potential on the collector of transistor 50 then moves in a positive direction. This positive-going voltage appears also on the base of transistor 10, thereby biasing the latter transistor to conduction. As a result of the conduction of transistor 10, the voltage $e_3$ tends to move in a negative direction. This negative-going potential of $e_3$ appears on the base of transistor 40 of the differential amplifier and tends to increase the conduction of transistor 40. Because of the constant current flow in the common emitter configuration of transistors 40 and 50, this increased conduction in transistor 40 results in a diminution of the current flow in transistor 50. The potential on the collector of transistor 50 then moves in a negative direction. Thus the differential amplifier represents a non-inverting type of amplifier in which a negative-going signal on the base of transistor 40 results in a negative-going signal on the collector of transistor 50. The negative-going signal on the collector of transistor 50, which is $e_4$, is fed to the base of transistor 10, which inverts this signal and produces a positive-going voltage on its collector electrode, thereby tending to compensate for the initial negative-going voltage variation in $e_3$.

Although not a design requirement, if the "alpha" of transistor 10 (the ratio of collector current to emitter current), is selected to be very nearly equal to one, then the magnitudes of the currents flowing respectively in the emitter and collector circuits are substantially the same. If a current having a constant rate of change with time is flowing through the inductance 20, a linear positive-going ramp of voltage, $e_0$, will be generated across potentiometer 30 in the emitter circuit of transistor 10. Therefore if inductance 20 is a perfect inductance, that is, an inductance having no resistive impedance associated therewith, then the action of feedback Loop "A" in maintaining a constant voltage across the inductance is all that would be required in producing a constant rate of change of voltage at the output terminal, 63. As a practical matter, however, inductance 20 is not perfect, but may be thought of as consisting of a pure inductive component in series with a resistive component. Therefore, as the output voltage ramp is generated, the current through the resistive component of the inductance is increasing. The result of this condition is that although feedback Loop "A" is maintaining a constant voltage across the inductance 20, the actual voltage across the pure inductive component must be decreasing, since the voltage drop across the resistive component is increasing. In order to obtain the desired constant rate of change of current with time, it is necessary that a constant voltage be applied across the pure inductive component of the inductance 20. Therefore in order to compensate for the fact that the voltage across the resistive component of inductance 20 is going to increase as the current increases, it is necessary to apply a voltage across inductance 20 which is progressively increasing.

In the circuit of FIG. 2, as the current through the inductance increases during the generation of the sweep output, a positive-going ramp of voltage may be visualized as appearing across the resistive component of inductance 20. If the voltage across inductance 20 is held constant, then a resultant negative-going ramp of voltage must be visualized as appearing across the pure inductive component of inductance 20. In order to compensate for the latter negative-going ramp, it is necessary to provide a corresponding negative-going ramp of voltage across the entire inductance 20. Thus, instead of maintaining the voltage $e_3$ on the collector of transistor 10 constant, a negative-going voltage at $e_3$ throughout the sweep cycle will insure that the voltage across the pure inductive component of inductance 20 is constant. In this manner a constant rate of change of current through inductance 20 is realized.

Feedback Loop "B" functions in a regenerative manner to provide the compensating negative-going ramp of voltage at $e_3$. As previously mentioned, the output voltage $e_0$ appearing at terminal 63 exhibits a positive-going ramp waveform. A portion of $e_0$, determined by the setting of the movable arm of potentiometer 30, is applied to the base of transistor 60. Transistor 60 inverts the signal and the voltage appearing on the collector electrode of this transistor is therefore a negative-going ramp. This last signal is applied to the base of transistor 50, is again inverted so that it is now positive-going on the collector of transistor 50, and is applied to the base of transistor 10. Transistor 10 performs the final inversion and causes the desired negative-going ramp of voltage to appear at $e_3$.

Thus the correction voltage needed for a precise linear output voltage has been derived from the output voltage, $e_0$. By supplying a constant voltage across the pure inductive component of the inductance L, a constant rate of current results.

As illustrated in FIG. 3, at time $t_2$, the instantaneous potential of the output voltage ramp ceases to go more positive and remains at substantially the same potential. This action stems from the circuit conditions during the generation of the sweep voltage waveform from time $t_1$ to $t_2$. During this period, transistor 50 is biased to increasingly greater conduction as a result of the feed-back portion of the output voltage appearing on its base electrode. As a result, a time $t_2$, transistor 50 is conducting heavily and transistor 40 is virtually non-conductive. Since substantially all of the current which can be drawn by the differential amplifier is now flowing in the emitter circuit of transistor 50, there can be no change in the amplitude of the current flowing in the collector path of transistor 50. Consequently, there is no change in the voltage on the collector of transistor 50. The voltage applied to the base of transistor 10 becomes constant in amplitude and there is no longer a time rate of change of voltage at the output terminal, 63. This last condition illustrated between times $t_2$ and $t_3$ in FIG. 3, persists until the control pulse $e_t$, which had initiated and maintained the sweep cycle, terminates at time $t_3$. At this time, the output voltage falls rapidly to the potential of the $-V_1$ supply and remains at this level until the succeeding sweep cycle is initiated.

FIG. 4 illustrates a second circuit embodiment constructed in accordance with the principles outlined in connection with the block diagram of FIG. 1. With respect to FIG. 1, the circuit of FIG. 4 includes a resistor 22 and a capacitor 32, corresponding respectively to impedance elements 15 and 25. Transistors 42 and 52 are of the NPN conductivity type and comprises a differential amplifier substantially identical to that comprised of transistors 40 and 50 in FIG. 2. Transistor 12, of PNP type, is the "phase-splitter." Potentiometer 72, in combination with transistor 62, also PNP type, form the "variable attenuator." A gating pulse $e_t$ needed to initiate and maintain the sweep cycle is applied to the base of PNP transistor 82.

A first terminal of resistor 22 is connected to a source of negative potential, $-V_{3'}$. This voltage corresponds to $e_1$ of FIG. 1. The second terminal of resistor 22 is connected to the collector of transistor 12 and to the base of transistor 42. The collector of transistor 52 is connected to the base of transistor 12. The emitter of transistor 12 is connected to a first terminal of capacitor 32. The second terminal of capacitor 32 is tied to ground potential, corresponding to $e_2$ of FIG. 1. Also connected in common to the first terminal of capacitor 32 are the collector of transistor 82 and the base of transistor 62.

The base of transistor 82 is adapted to be pulsed by trigger pulses $e_t$. The emitter of transistor 82 is coupled to a source of positive potential $V_{2'}$.

The output saw-tooth voltage, $e_0$, appears across capacitor 32 and is available for utilization at terminal 63. If desired, the output voltage may also be taken across the emitter impedance of transistor 62. The collector of transistor 62 is connected to the movable contact arm of potentiometer 72, which has its terminals connected respectively to the base of transistor 52 and to potential source $-V_{1'}$. The collector of transistors 42 and 52 are each coupled by respective impedances to a source of positive potential $V_{1'}$; the emitters of these last transistors are coupled in common to negative source $-V_{4'}$ by way of resistor 45. The cathode electrode of diode 92 is connected to the base of transistor 12 while its plate electrode is connected to negative potential $-V_{2'}$.

In addition to the voltages mentioned previously, potential $e_3$ appears on the collector of transistor 12 and the base of transistor 42; $e_4$, on the base of transistor 12, and the collector of transistor 52. Voltage $e_5$ appears on the base of transistor 52.

Feedback Loop "A" comprises the electrical path linking the collector of transistor 12, the base of transistor 42, the common emitter electrodes of transistors 42, 52, the collector of transistor 52, and the base-collector path of transistor 12.

Feedback Loop "B" includes the emitter electrode of transistor 12, the base-collector circuit of transistor 62, a portion of potentiometer 72, the base collector-path of transistor 52, and the base emitter circuit of transistor 12.

The operation of the circuit of FIG. 4 is similar to that of FIG. 2. If constant current flows into the terminals or plates of a capacitor, the voltage change developed across the terminals will be constant with respect to time. The function of the circuit embodiment of FIG. 4 is to maintain a constant current flow into the terminals of capacitor 32.

Referring also to the waveform diagram of FIG. 5, it is assumed that at time $t_0$ the circuit is in a quiescent state. The voltage appearing on the base of transistor 82 at this time biases transistor 82 to non-conduction. As a result of the preceeding sweep cycle, capacitor 32 is in a charged state—the collector of transistor 82 and output terminal 63 both being at substantially the potential of the $-V_{2'}$ supply.

At time $t_1$, a pulse $e_t$ is applied to the base of transistor 82 via terminal 55. Transistor 82 is driven to conduction. Capacitor 32 is discharged through transistor 82 and the voltage on the output terminal side of the capacitor rises in a positive direction. The circuit output will then remain at a fixed level while pulse $e_t$ is present. At time $t_2$, pulse $e_t$ terminates and capacitor 32 begins to charge. The voltage on the output terminal side of capacitor 32 begins to go negative. The important consideration is to have a constant charge current flowing in the emitter circuit of transistor 12. This condition will result if the collector current of transistor 12 is held constant.

As described in connection with FIG. 2, the feedback Loop "A" will tend to compensate for variations in the voltage $e_3$, and thereby maintain a constant voltage across resistor 22. For example, a tendency for the decrease in the amplitude of $e_3$ results in a negative-going voltage applied to the base of transistor 42. This negative-going voltage produces a negative-going voltage on the collector of transistor 52. This latter voltage appears on the base of transistor 12, is inverted, and appears as a positive-going voltage on the collector of transistor 12. Thus this last voltage tends to balance out or correct for the original negative-going variation at $e_3$.

Theoretically, if a pure capacitance element and a constant current generator comprised of ideal components were utilized to generate an output ramp of voltage, perfect linearity would result. In practice such ideal elements and components do not exist. In order to compensate for the non-linearity introduced by the practical circuit components a degenerative feedback loop, such as Loop "A," may be employed. However, the ability of Loop "A" to completely compensate for variations in the voltage across resistor 22 is a function of the gain of the loop. As indicated previously, in order to completely cancel unwanted variations in the amplitude of the voltage $e_3$, the circuit gain of the feedback loop must be infinite. Since infinite gain cannot be realized, the present circuit utilizes a regenerative feedback circuit, Loop "B," in combination with feedback Loop "A" to achieve a high degree of linearity. The circuit gain of Loop "A" is designed to be a practical moderate value, and Loop "B" tends to make up for the deficiency of Loop "A" in the matter of compensation.

During the time $t_2$–$t_3$, as illustrated graphically in FIG. 5, capacitor 32 is charging and the voltage on the base of transistor 62, and at $e_0$, is a negative-going ramp. The collector of transistor 62 exhibits a positive-going potential, which after successive inversions appears as a positive-going potential on the collector of transistor 12. In practice the actual amount of voltage fed back is small, that is, the voltage across resistor 22 is only slightly increasing during the sweep cycle. As previously mentioned, the effect of this slightly increasing voltage is to compensate for non-linearity present in the output waveform. The amount of the voltage fed back to insure linearity is controlled by the setting of potentiometer 72.

At time $t_3$, the output voltage approaches the clamp potential $-V_{2'}$, and is clamped by diode 92. The output will remain at this level until the next trigger pulse occurs as, for example, at time $t_4$.

From the foregoing consideration of the representative embodiments of the present invention, it is apparent that the configuration of solid state electronic components depicted herein result in a highly linear time base generator. Other modifications of the circuits depicted herein, adapted to fit particular operating requirements, will be apparent to those skilled in the art. Consequently the invention is not considered limited to the embodiments chosen for purposes of disclosure, but covers instead all changes and modifications which do not constitute departures from the true spirit and scope of this invention. Accordingly all such variations as are in accord with the principles discussed previously are meant to fall within the scope of the appended claims.

What is claimed is:

1. A linear time-base generator comprising a pair of impedance elements each having first and second terminals, means for connecting the first terminals of said impedance elements respectively to sources of potential, phase-splitting means having an input terminal and a pair of output terminals, means for connecting the output terminals of said phase-splitting means respectively to the second terminals of said impedance elements, first and second feedback loops, a difference circuit having a pair of input terminals and an output terminal, circuit means coupling said first and second feedback loops between respective ones of said pair of output terminals of said phase-splitting means and respective ones of said pair of input terminals of said difference circuit, and circuit means for operatively connecting said output terminal of said difference circuit to the input terminal of said phase-splitting means.

2. A circuit for generating a linear time-base voltage comprising first and second impedance elements, phase-splitting means having a single input terminal and a pair of output terminals, circuit means for coupling the output terminals of said phase-splitting means respectively to said impedance elements, a first degenerative feedback loop and a second regenerative feedback loop, a difference circuit having a pair of input terminals and an output terminal, means for coupling said first feedback loop between one of said pair of output terminals of said phase-splitting means and one of said pair of input terminals of said difference circuit, means for coupling said second feedback loop between the other of said pair of output terminals of said phase-splitting means and the other of said pair of input terminals of said difference circuit, said second feedback loop including variable signal attenuating means, and amplifier means operatively connected to both said difference circuit and said phase-splitting means and effectively providing said first and second feedback loops with a common path linking the output terminal of said difference circuit to the input terminal of said phase-splitting means.

3. A linear time-base generator comprising a pair of impedance elements each having first and second terminals, means for connecting the first terminals of said impedance elements respectively to sources of fixed potential, phase-splitting means having an input terminal and a pair of output terminals, means for connecting the output terminals of said phase-splitting means respectively to said second terminals of said impedance elements, said phase-splitting means being adapted to cause current flow through said impedance elements in response to the signal voltage applied to its input terminal, first and second feedback loops, means for coupling said first feedback loop to the second terminal of one of said impedance elements and being adapted in the absence of said second feedback loop to maintain the voltage on said latter terminal substantially constant, means for coupling said second feedback loop to the second terminal of the other of said impedance elements and being adapted in the absence of said first feedback loop to cause the voltage on the second terminal of the said one impedance element to vary by a predetermined amount, a difference circuit having a pair of input terminals and an output terminal, said first and second feedback loops being connected respectively to said input terminals of said difference circuit, and amplifier means connected to the output terminal of said difference circuit and effectively coupling said first and second feedback loops in common to the input terminal of said phase-splitting means, whereby the combined functions of said feedback loops result in a constant rate of change of current with time flowing through one of said impedance elements and a corresponding output voltage having a linear time-base waveform being developed across the other of said impedance elements.

4. The circuit as defined in claim 3 characterized in that said second feedback loop includes variable attenuation means for adjusting the amplitude of the voltage fed back to the input terminal of the difference circuit to which said second feedback loop is connected.

5. A linear time-base generator comprising a resistive element and a reactive element each having first and second terminals, means for connecting said first terminals of said elements respectively to sources of potential, a phase-splitter circuit having an input terminal and a pair of output terminals, means for connecting the output terminals of said phase-splitter respectively to the second terminals of said elements, said phase-splitter being adapted to cause current flow through said elements in response to the voltage applied to its input terminal, first and second feedback loops, a differential amplifier circuit having a pair of input terminals and an output terminal, means for coupling said first feedback loop between the second terminal of said resistive element and one of the input terminals of said differential amplifier, means for coupling said second feedback loop between the second terminal of said reactive element and the other input terminal of said differential amplifier, and circuit means for coupling in common said first and second feedback loops from the output terminal of said differential amplifier to the input terminal of said phase-splitter.

6. A linear time-base generator comprising in combination a resistor and an inductor, each having first and second terminals, said first terminals of said resistor and inductor being connected respectively to sources of potential, a phase-splitter circuit having an input terminal and a pair of output terminals, said output terminals of said phase-splitter being connected respectively to the second terminals of said resistor and inductor, said phase-splitter being adapted to supply current flow through said resistor and inductor in response to the voltage applied to its input terminal, the output voltage of said generator being developed across said resistor in response to the current flow provided therethrough by said phase-splitter, first and second feedback loops, said first feedback loop being coupled to the second terminal of said inductor and being adapted in the abesence of said second feedback loop to maintain the voltage across said inductor substantially constant, said second feedback loop being coupled to the second terminal of said resistor and being adapted in the absence of said first feedback loop to cause the voltage on the second terminal of said inductor to vary by an amount necessary to compensate for the varying voltage drop across the resistive component of said inductor during the generation of said output voltage, circuit means coupling said first and second feedback loops in common to the input terminal of said phase-splitter, whereby the combined functions of said feedback loops result in a constant voltage being developed across the pure inductive component of said inductor, and a corresponding output voltage having a linear time base being developed across said resistor.

7. The circuit as defined in claim 6 characterized in that said circuit means for coupling said first and second feedback loops in common to the input terminal of said phase-splitter comprises a differential amplifier circuit having a pair of input terminals and an output terminal, said first and second feedback loops being connected respectively to said input terminals of said differential amplifier circuit, the output terminal of said differential amplifier being connected to the input terminal of said phase-splitter.

8. The circuit as defined in claim 7 characterized in that said second feedback loop includes a variable signal attenuator for adjusting the amplitude of the output voltage fed back to the differential amplifier input terminal to which said second feedback loop is connected, thereby determining the amplitude of the compensatory voltage appearing at the second terminal of said inductor.

9. A circuit for generating a linear time-base voltage comprising in combination a resistor and a capacitor, each having first and second terminals, said first terminals being connected respectively to sources of potential, a phase-splitter circuit having an input terminal and a pair of output terminals, said output terminals of said phase-splitter being connected respectively to the second terminals of said resistor and capacitor, said phase-splitter being adapted to supply current flow through said resistor and capacitor in response to the voltage applied to its input terminal, said linear time-base voltage appearing across said capacitor in response to the charging current applied thereto by said phase-splitter, first and second feedback loops, said first feedback loop being coupled to the second terminal of said resistor and being adapted in the absence of said second feedback loop to maintain the voltage across said resistor substantially constant, said second feedback loop being coupled to the second terminal of said capacitor and being adapted in the absence of said first feedback loop to cause the voltage on the second terminal of said resistor to vary by an amount necessary to compensate for the non-linearity of the voltage developed across said capacitor during the charging thereof, circuit means coupling said first and second feedback loops in common to the input terminal of said phase-splitter, whereby the combined functions of said feedback loops result in a predetermined variation in the voltage developed across said resistor and a corresponding output voltage having a linear time-base being developed across said capacitor.

10. The circuit as defined in claim 9 characterized in that said circuit means for coupling said first and second feedback loops in common to the input terminal of said phase-splitter comprises a differential amplifier circuit having a pair of input terminals and an output terminal, said first and second feedback loops being connected respectively to said input terminals of said differential amplifier circuit, the output terminal of said differential amplifier being connected to the input terminal of said phase-splitter.

11. The circuit as defined in claim 10 characterized in that said second feedback loop includes a variable signal attenuator for adjusting the amplitude of the output voltage fed back to the differential amplifier input terminal to which said second feedback loop is connected, thereby determining the amplitude of the compensatory voltage appearing at the second terminal of said resistor.

12. A linear time-base generator comprising a pair of impedance elements each having first and second terminals, said first terminals being connected respectively to sources of fixed potential, a first current amplifying device having at least first, second, and third electrodes, said first and second of said electrodes of said first amplifying device being connected respectively to the second terminals of said impedance elements, first and second feedback loops, circuit means coupling said feedback loops respectively to said second terminals of said impedance elements, second and third current amplifying devices, each of said devices having at least first, second, and third electrodes, means coupling in common said first of the electrodes of each of said second and third amplifying devices to a source of bias potential, circuit means coupling said feedback loops respectively to said second of said electrodes of each of said second and third amplifying devices, and circuit means including said third electrode of said third amplifying device for operatively connecting said feedback loops in common to said third electrode of said first amplifying device.

13. A linear time-base generator comprising a variable resistor and an inductor, said resistor having first and second fixed terminals and a movable third terminal, said inductor having first and second terminals, the first terminals of said resistor and inductor being connected respectively to sources of fixed potential, a first current amplifying device having at least first, second, and third electrodes, said first and second of said electrodes of said first amplifying device being connected respectively to the second terminals of said resistor and inductor, said first current amplifying device being adapted to cause current flow through said resistor and inductor in response to the voltage applied to a third electrode of said last device, first and second feedback paths, said first feedback path being coupled to the second terminal of said inductor, second and third current amplifying devices each having at least first, second, and third electrodes, means coupling in common said first electrode of each of said second and third amplifying devices to a source of bias potential, means for coupling said first feedback path to said second electrode of said second amplifying device, means for coupling said third electrodes of said second and third amplifying devices respectively to a source of bias potential, said second feedback path including a fourth amplifying device, said fourth amplifying device having at least first, second and third electrodes, said first electrode of said fourth amplifying device being coupled to said movable third terminal of said resistor, said second electrode of said fourth amplifying device being coupled to a source of bias potential, said third electrode of said fourth amplifying device being coupled to said second electrode of said third amplifying device, and circuit means for connecting said third electrode of said third amplifying device to said third electrode of said first amplifying device, thereby providing a common connection for said feedback paths.

14. The circuit as defined in claim 13 characterized in that said first and fourth current amplifying devices are transistors of the same conductivity type and said second and third current amplifying devices are transistors of a conductivity type opposite to that of said other transistors.

15. A linear time-base generator comprising a resistor and a capacitor, each having first and second terminals, said first terminals of said resistor being connected to a source of bias potential, said first terminal of said capacitor being connected to a reference potential, a first current amplifying device having at least first, second, and third electrodes, said first and second of said electrodes of said first current amplifying device being connected respectively to the second terminals of said resistor and capacitor, said first current amplifying device, causing current flow through said resistor and providing charging current for said capacitor in response to the voltage applied to a third of its electrodes, first and second feedback paths, said first feedback path being coupled to the second terminal of said resistor, second and third current amplifying devices each having at least first, second and third electrodes, means coupling in common said first of said electrodes of each of said second and third amplifying devices to a source of bias potential, means for coupling said first feedback path to said second electrode of said second amplifying device, said second feedback path including a fourth amplifying device and a variable attenuator, said fourth amplifying device having at least first, second, and third electrodes, said variable attenuator having two fixed terminals and a movable terminal, said first of the electrodes of said fourth amplifying device being connected to the second terminal of said capacitor, said second electrode of said fourth amplifying device being connected to a source of bias potential, said third electrode of said fourth amplifying device being connected to the movable terminal of said attenuator, one of said fixed terminals of said attenuator being connected to a source of potential, the other of said first terminals of said attenuator being connected to said second electrode of said third amplifying device and circuit means for connecting said third electrode of said third amplifying device to said third electrode of said first amplifying device, thereby providing a common connection for said feedback paths.

16. A circuit as defined in claim 15 including a diode having a pair of terminals, a first of said terminals being connected to a source of clamp potential and the other of said terminals being connected in common to the respective third electrodes of said first and third amplifying devices, said diode serving to clamp the voltage developed across said capacitor during the charging thereof to substantially the amplitude of said clamp potential.

17. A circuit as defined in claim 15 including a fifth current amplifying device having at least first, second and third electrodes, said first electrode of said fifth amplifying device being connected to said second terminal of said capacitor, said second electrode of said fifth amplifying device being coupled to a source of bias potential and said a third electrode of said fifth amplifying device being coupled to a source of trigger pulses, each of said latter pulses serving to initiate and sustain the generation of the linear time-base waveform.

18. A circuit as defined in claim 17 characterized in that said first, fourth and fifth current amplifying devices are transistors of the same conductivity type and said second and third current amplifying devices are transistors of a conductivity type opposite to that of said other transistors.

References Cited by the Examiner

UNITED STATES PATENTS 2,916,702 12/59 Bigelow ----------- 330—104 X

ARTHUR GAUSS, *Primary Examiner.*